US009865407B2

(12) United States Patent
Park

(10) Patent No.: US 9,865,407 B2
(45) Date of Patent: Jan. 9, 2018

(54) INTERLOCK APPARATUS OF RING MAIN UNIT

(71) Applicant: LSIS CO., LTD., Anyang-si, Gyeonggi-do (KR)

(72) Inventor: Jinhyun Park, Anyang-si (KR)

(73) Assignee: LSIS CO., LTD., Anyang-si (KR)

( * ) Notice: Subject to any disclaimer, the term of this patent is extended or adjusted under 35 U.S.C. 154(b) by 0 days.

(21) Appl. No.: 15/390,269

(22) Filed: Dec. 23, 2016

(65) Prior Publication Data

US 2017/0194112 A1 Jul. 6, 2017

(30) Foreign Application Priority Data

Dec. 30, 2015 (KR) ........................ 10-2015-0190351

(51) Int. Cl.

| | |
|---|---|
| ***H01H 9/20*** | (2006.01) |
| ***H01H 9/04*** | (2006.01) |
| ***H01H 71/02*** | (2006.01) |
| ***H01H 31/06*** | (2006.01) |
| ***H02B 11/133*** | (2006.01) |
| ***H01H 9/24*** | (2006.01) |
| ***H01H 9/26*** | (2006.01) |
| *H01H 9/28* | (2006.01) |
| *H01H 33/12* | (2006.01) |

(52) U.S. Cl.

CPC ................ *H01H 9/24* (2013.01); *H01H 9/26* (2013.01); *H01H 9/287* (2013.01); *H01H 33/121* (2013.01)

(58) Field of Classification Search

CPC ........ H02B 11/133; H01H 9/20; H01H 71/02; H01H 9/04; H01H 31/06

USPC ................................ 361/607, 609, 615–617

See application file for complete search history.

(56) References Cited

U.S. PATENT DOCUMENTS

| | | | | |
|---|---|---|---|---|
| 3,783,209 A * | 1/1974 | Cleaveland | H02B 11/133 200/50.25 |
| 4,926,286 A * | 5/1990 | Maki | H02B 1/14 200/50.17 |
| 5,955,716 A | 9/1999 | Thuries et al. | |
| 6,437,262 B1 | 8/2002 | Gupta et al. | |
| 6,545,234 B1 * | 4/2003 | Trivette | H01H 33/666 200/50.21 |

(Continued)

FOREIGN PATENT DOCUMENTS

| | | |
|---|---|---|
| CN | 203552983 | 4/2014 |
| DE | 1125514 | 3/1962 |

(Continued)

OTHER PUBLICATIONS

European Patent Office Application Serial No. 16197800.2, Search Report dated May 4, 2017, 7 pages.

(Continued)

*Primary Examiner* — Gary Paumen

(74) *Attorney, Agent, or Firm* — Lee, Hong, Degerman, Kang & Waimey PC

(57) ABSTRACT

An interlock apparatus of a ring main unit is provided. The interlock apparatus of the ring main unit may change a rotational motion of the shaft included in the circuit breaker to a rectilinear motion, and thus, the insertion hole may be opened or closed according to a closed or cutoff state of the circuit breaker. Accordingly, in the closed state of the circuit breaker, the control of a state of the disconnector is prevented.

11 Claims, 15 Drawing Sheets

(56) References Cited

U.S. PATENT DOCUMENTS

| | | | | |
|---|---|---|---|---|
| 7,012,493 | B1 * | 3/2006 | Marks | H01H 71/126 335/167 |
| 8,299,377 | B2 | 10/2012 | Jurek et al. | |
| 9,620,304 | B2 * | 4/2017 | Lee | H01H 9/04 |
| 9,685,282 | B2 * | 6/2017 | Mun | H01H 9/20 |
| 2010/0157512 | A1 * | 6/2010 | Yee | H02B 1/36 361/614 |
| 2012/0118716 | A1 * | 5/2012 | Najera | H01H 9/26 200/5 A |
| 2013/0187733 | A1 | 7/2013 | Bullock et al. | |
| 2013/0248338 | A1 | 9/2013 | Belloni et al. | |
| 2016/0126028 | A1 * | 5/2016 | Mun | H02B 11/133 200/50.12 |

FOREIGN PATENT DOCUMENTS

| | | |
|---|---|---|
| EP | 2645395 | 10/2013 |
| JP | H07211171 | 8/1995 |
| JP | 2000139004 | 5/2000 |
| JP | 2001351483 | 12/2001 |
| JP | 2004199973 | 7/2004 |
| JP | 2005197168 | 7/2005 |
| JP | 2008285974 | 11/2008 |
| JP | 2010098776 | 4/2010 |
| JP | 2015122152 | 7/2015 |
| KR | 20000073041 | 12/2000 |
| KR | 101119744 | 3/2012 |
| KR | 101293481 | 8/2013 |
| KR | 1020140134134 | 11/2014 |
| KR | 101480846 | 1/2015 |

OTHER PUBLICATIONS

Korean Intellectual Property Office Application No. 10-2015-0190351, Office Action dated Apr. 18, 2017, 4 pages.

Korean Intellectual Property Office Application No. 10-2015-0190351, Notice of Allowance dated Jun. 21, 2017, 7 pages.

Korean Intellectual Property Office Application No. 10-2015-0190351, Notice of Allowance dated Dec. 30, 2015, 4 pages.

Japan Patent Office Application No. 2016-234165, Office Action dated Oct. 17, 2017, 3 pages.

* cited by examiner

INTERLOCK APPARATUS OF RING MAIN UNIT

CROSS-REFERENCE TO RELATED APPLICATION

Pursuant to 35 U.S.C. §119(a), this application claims the benefit of earlier filing date and right of priority to Korean Patent Application No. 10-2015-0190351, filed on Dec. 30, 2015, the contents of which are all hereby incorporated by reference herein in its entirety.

BACKGROUND OF THE DISCLOSURE

1. Field of the Disclosure

The present disclosure relates to an interlock apparatus of a ring main unit, and particularly, to an interlock apparatus of a ring main unit, which enables a state of a disconnector to be controlled based on a state of a circuit breaker included in the ring main unit.

2. Background of the Disclosure

Generally, a ring main unit is an apparatus that is used for monitoring, controlling, and protecting an electric system used to receive and distribute power supplied from power distribution equipment. The ring main unit is configured with an array where a circuit breaker, a switchgear, a ground, conductors, and the like are included in a structure sealed and insulated by an $SF_6$ gas.

The ring main unit includes a circuit breaker, a load switch, a fuse, a disconnector, etc. A cable cover is detachably attached on the ring main unit, for protecting each of circuits.

FIG. 1 is a front view illustrating a state where a cover is removed from a related art ring main unit 10. FIG. 2 is a perspective view illustrating a circuit breaker included in the related art ring main unit 10. FIG. 3 is a perspective view illustrating a disconnector included in the related art ring main unit 10. FIG. 4 is a front view illustrating the disconnector included in the related art ring main unit 10. FIG. 5 is a perspective view illustrating a handle for controlling a state of the disconnector included in the related art ring main unit 10. FIG. 6 is a perspective view illustrating a state where the handle is caught in the disconnector included in the related art ring main unit 10.

As illustrated in FIGS. 1 to 5, the related art ring main unit 10 includes a circuit breaker 11, a disconnector 13, and a load switch (not shown). An interlock apparatus is provided between the circuit breaker 11 and a cable cover (not shown). Also, the interlock apparatus is provided between the disconnector 13 and the cable cover. Therefore, the cable cover may be detached only when the circuit breaker 11 and the disconnector 13 are in a cutoff state.

At this time, an open/closed state of the circuit breaker 11 is controlled through a button, and an open/closed state of the disconnector 13 is controlled by rotating a handle 20 by about 180 degrees after the handle 20 is inserted into an insertion hole 13*a* provided in the disconnector 13.

However, in the related art ring main unit 10, the interlock apparatus is not provided between the circuit breaker 11 and the disconnector 13, and for this reason, even when the circuit breaker 11 is in a closed state, a state of the disconnector 13 is controlled by rotating the handle 20 after the handle is inserted into the insertion hole 13*a*.

Moreover, if the disconnector 13 having no load switching function operates when the circuit breaker 11 is in the closed state, a large shock is applied to the ring main unit 10, and for this reason, the ring main unit 10 is largely broken.

Moreover, if the disconnector 13 operates when the circuit breaker 11 is in the closed state, a negligent accident occurs in use, and for this reason, the risk of life loss is large.

SUMMARY OF THE DISCLOSURE

Therefore, an aspect of the detailed description is to provide an interlock apparatus of a ring main unit, which enables a state of a disconnector to be controlled based on a state of a circuit breaker included in the ring main unit.

To achieve these and other advantages and in accordance with the purpose of this specification, as embodied and broadly described herein, an interlock apparatus of a ring main unit, including a circuit breaker which includes a shaft operating according to a closing or cutoff operation and a disconnector where an insertion hole into which a handle for controlling a closed or cutoff state is inserted is provided, includes: a rotary member configured to rotate in cooperation with the shaft according to a rotation of the shaft; an upper link coupled to the rotary member to vertically move according to a rotation of the rotary member; a lower link coupled to the upper link to vertically move according to a movement of the upper link; and an insertion prevention plate coupled to a lower portion of the lower link to vertically move according to a movement of the lower link, wherein when the circuit breaker is in the closed state, the insertion prevention plate closes the insertion hole, and when the circuit breaker is in the cutoff state, the insertion prevention plate opens the insertion hole.

Moreover, the rotary member may include: a body plate fitted into one end of the shaft; and a fitting part protruding to a side of the body plate, an upper portion of the upper link being fitted into the fitting part.

Moreover, a first adhesion plate may be provided in a front end of the fitting part so that the upper link does not deviate from the fitting part in a state of being fitted into the fitting part. Also, a second adhesion plate may be provided in the fitting part to prevent the upper link from moving toward the body plate in a state of being fitted into the fitting part, and may be disposed to be spaced apart from the first adhesion plate in a direction from the first adhesion plate to the body plate.

Moreover, the upper link may include: a first vertical plate, an upper portion of the first vertical plate being fitted into the rotary member; a horizontal plate provided to extend and bent in a direction from the first vertical plate to a side; and a second vertical plate provided to extend and bent in a direction from the horizontal plate to a lower side, an upper portion of the lower link being coupled to the second vertical plate.

Moreover, a plurality of through holes may be respectively provided at correspondence positions in the upper portion of the lower link and the second vertical plate, and a fastening member may pass through the plurality of through holes, and the lower link may be coupled to the second vertical plate.

Moreover, the interlock apparatus may further include a guide member disposed adjacent to the insertion prevention plate to guide a vertical movement of the insertion prevention plate.

Moreover, the guide member may include: a connection plate coupled to the disconnector; an extension plate provided to extend to a side of the connection plate; and a guide plate provided to extend to a lower side of the extension plate, the guide hole guiding a movement of the insertion prevention plate.

Moreover, the insertion prevention plate may include: a front plate disposed in front of the insertion hole; and a side plate provided to extend and bent in a direction from one end to an inner side of the front plate, the lower link being coupled to the side plate.

Moreover, a through hole may be provided in each of the side plate and the lower portion of the lower link, and a fastening member may pass through the through hole. Also, the side plate may be coupled to the lower link.

Moreover, a connection part may be provided in an upper end of the front plate to protrude to an upper side, and a connection hole may be provided in the connection part. Also, a washer may be provided in front of the guide plate, and a connection pin may be coupled to pass through the washer, the guide hole, and the connection hole. Also, the insertion prevention plate may move along the guide hole in a state of being closely adhered to the guide member.

Moreover, a fastening hole may be provided in a front end of the connection pin, and a fixing pin may be fastened into the fastening hole. Also, the fixing pin may be disposed in front of the washer to pass through the fastening hole, and may prevent the washer from deviating from a normal position.

As described above, the interlock apparatus of the ring main unit according to an embodiment of the present invention may change a rotational motion of the shaft included in the circuit breaker to a rectilinear motion, and thus, the insertion hole may be opened or closed according to a closed or cutoff state of the circuit breaker. Accordingly, in the closed state of the circuit breaker, the control of a state of the disconnector is prevented.

Moreover, when the circuit breaker is in the closed state, the control of a state of the disconnector is prevented, thereby preventing a breakage of the ring main unit which is caused by manipulation of the disconnector when the circuit breaker is in the closed state.

Moreover, when the circuit breaker is in the closed state, the control of a state of the disconnector is prevented, and thus, a negligent accident caused by manipulation of the disconnector does not occur, thereby preventing a user from being damaged.

Moreover, since the fitting part is provided in the rotary member and the fitting part includes the first adhesion plate and the second adhesion plate, the first adhesion plate prevents the upper link from deviating from the fitting part in a state where the upper link is fitted into the fitting part, and moreover, the second adhesion plate prevents a movement of the upper link to an inner side. Accordingly, the upper link is solidly coupled to the fitting part.

Moreover, the interlock apparatus may include the upper link, the lower link, and the insertion prevention plate, and thus, the upper link, the lower link, and the insertion prevention plate may be coupled to each other through the fastening members. Accordingly, assembly or disassembly of the interlock apparatus is easily made.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, an interlock apparatus of a ring main unit according to an embodiment of the present invention will be described in detail with reference to the accompanying drawings.

Figure 1:
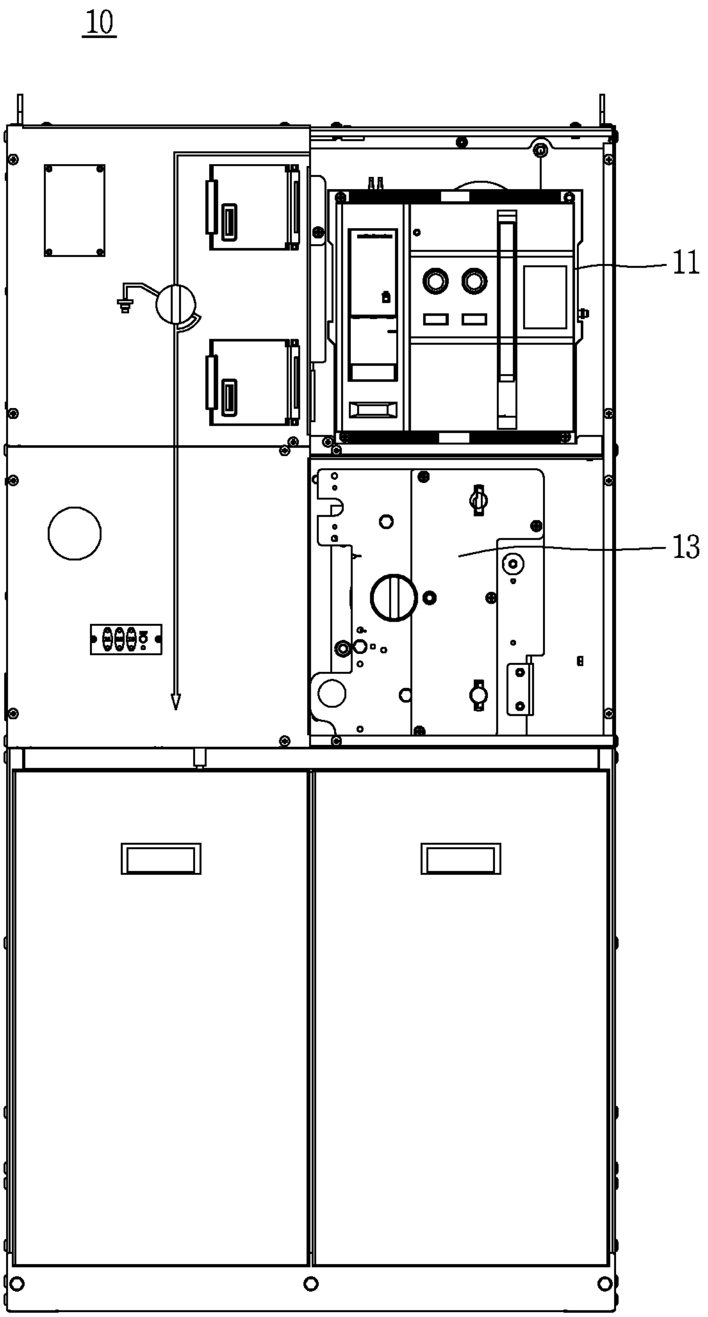
FIG. 1 CONVENTIONAL ART
FIG. 1 is a front view illustrating a state where a cover is removed from a related art ring main unit.
Figure 2:
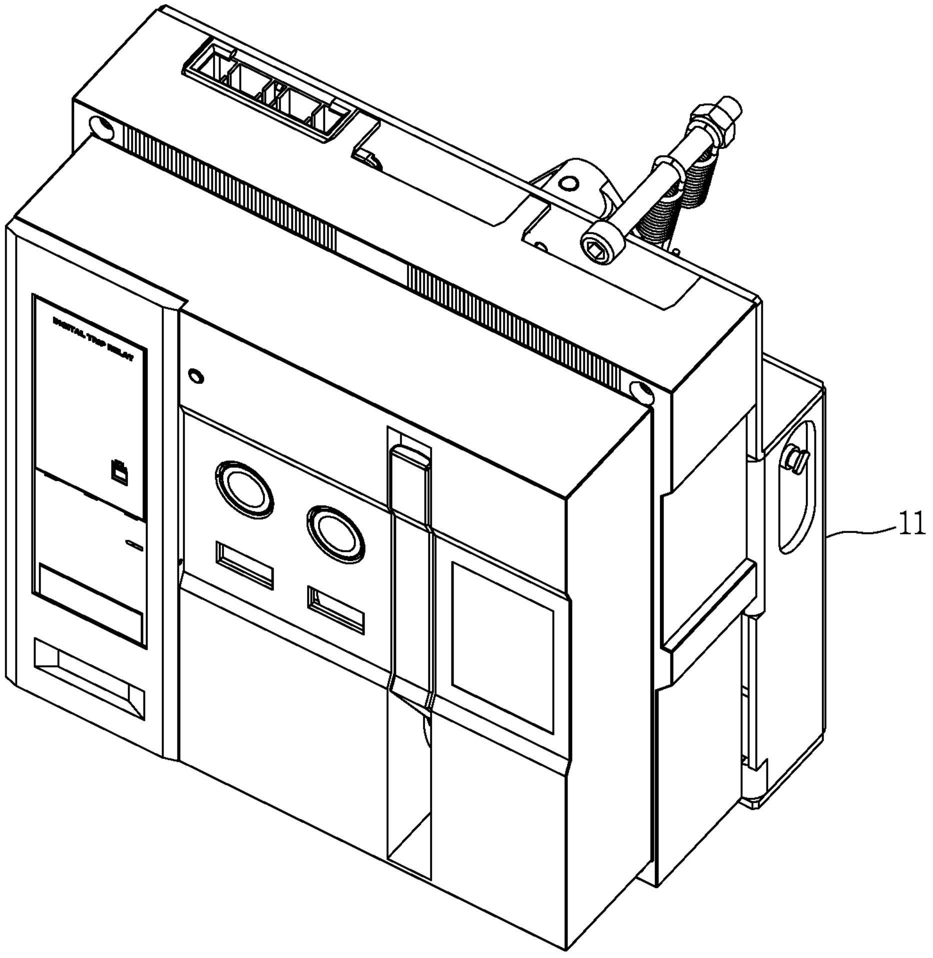
FIG. 2 CONVENTIONAL ART
FIG. 2 is a perspective view illustrating a circuit breaker included in the related art ring main unit.
Figure 3:
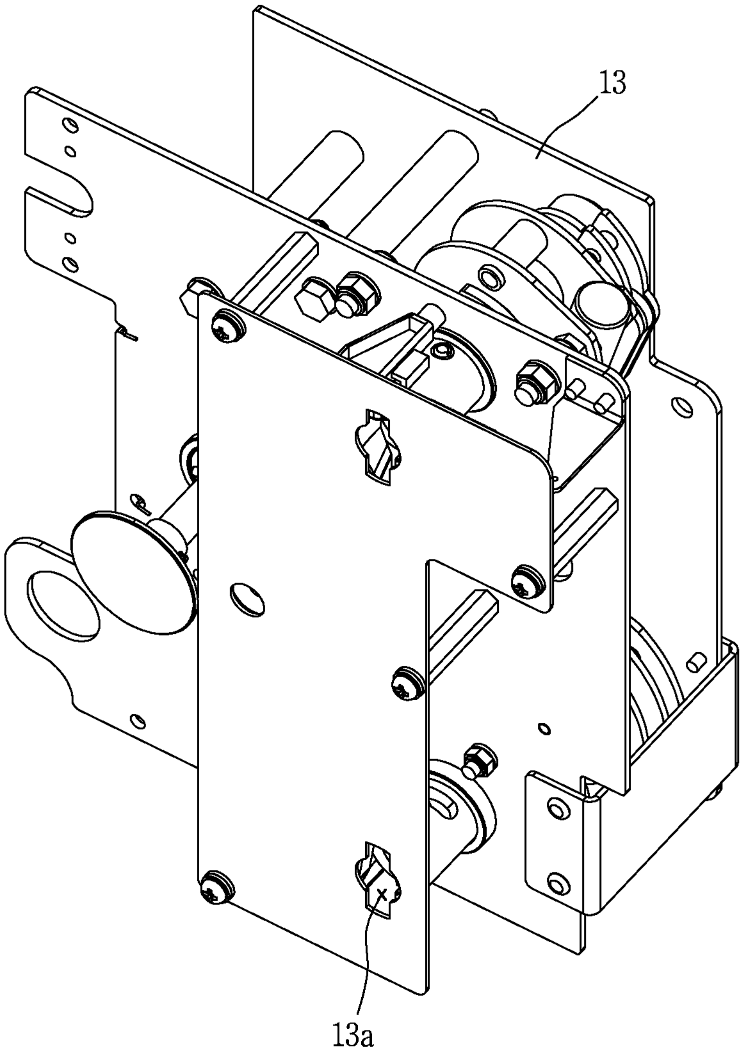
FIG. 3 CONVENTIONAL ART
FIG. 3 is a perspective view illustrating a disconnector included in the related art ring main unit.
Figure 4:
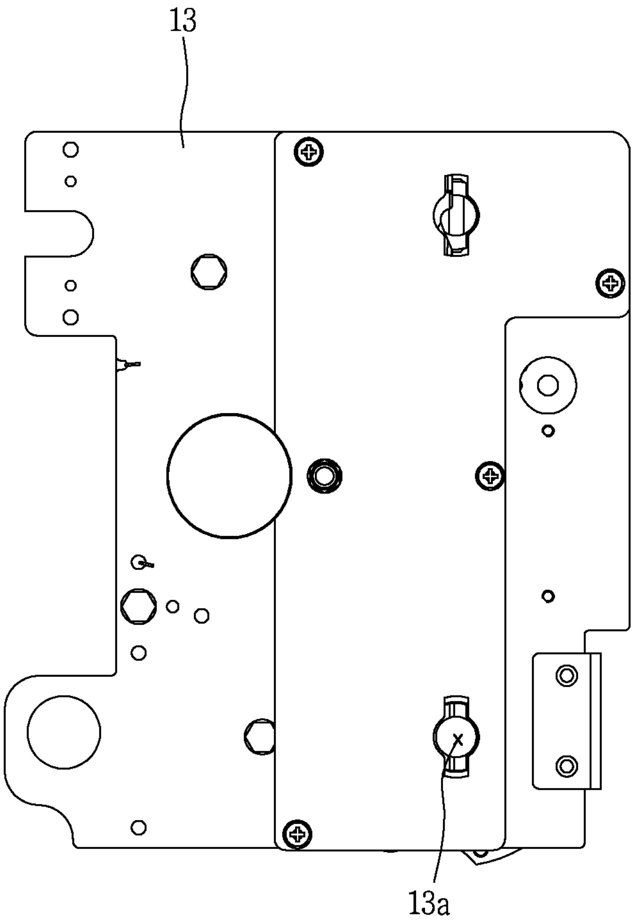
FIG. 4 CONVENTIONAL ART
FIG. 4 is a front view illustrating the disconnector included in the related art ring main unit.
Figure 5:
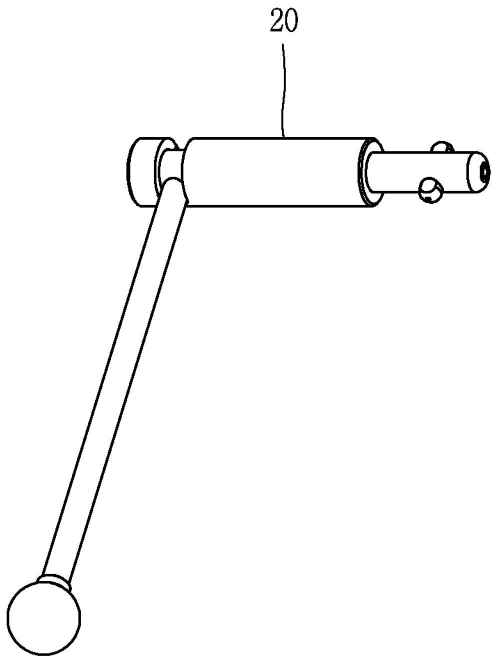
FIG. 5 CONVENTIONAL ART
FIG. 5 is a perspective view illustrating a handle for controlling a state of the disconnector included in the related art ring main unit.
Figure 6:
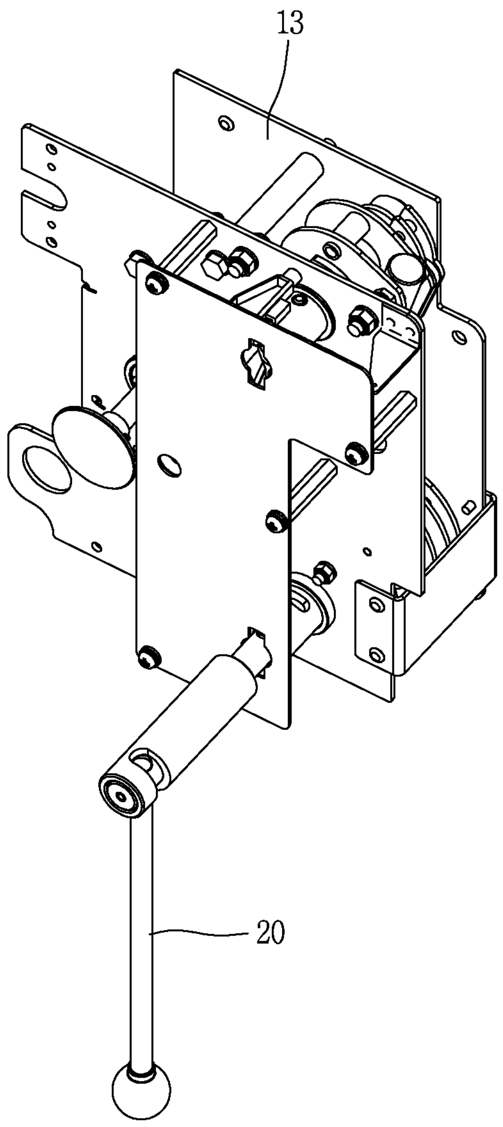
FIG. 6 CONVENTIONAL ART
FIG. 6 is a perspective view illustrating a state where the handle is caught in the disconnector included in the related art ring main unit.
Figure 7:
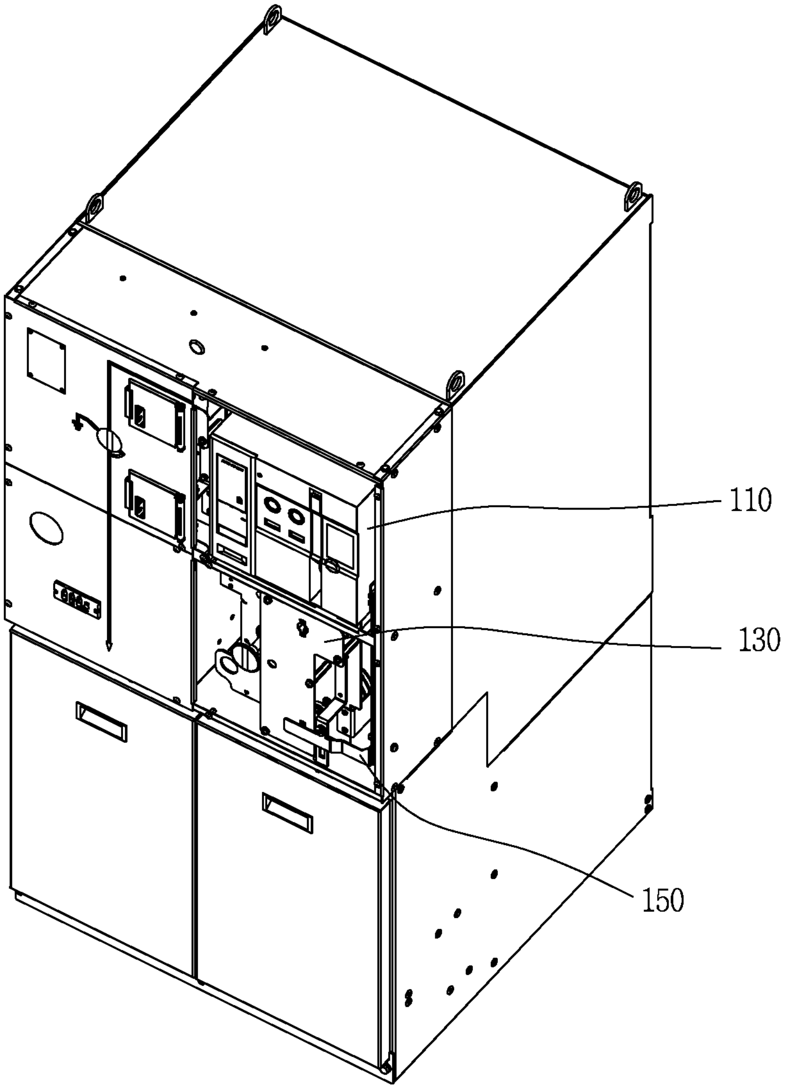
FIG. 7 is a perspective view illustrating a state where an interlock apparatus is included in a ring main unit according to an embodiment of the present invention.
Figure 8:
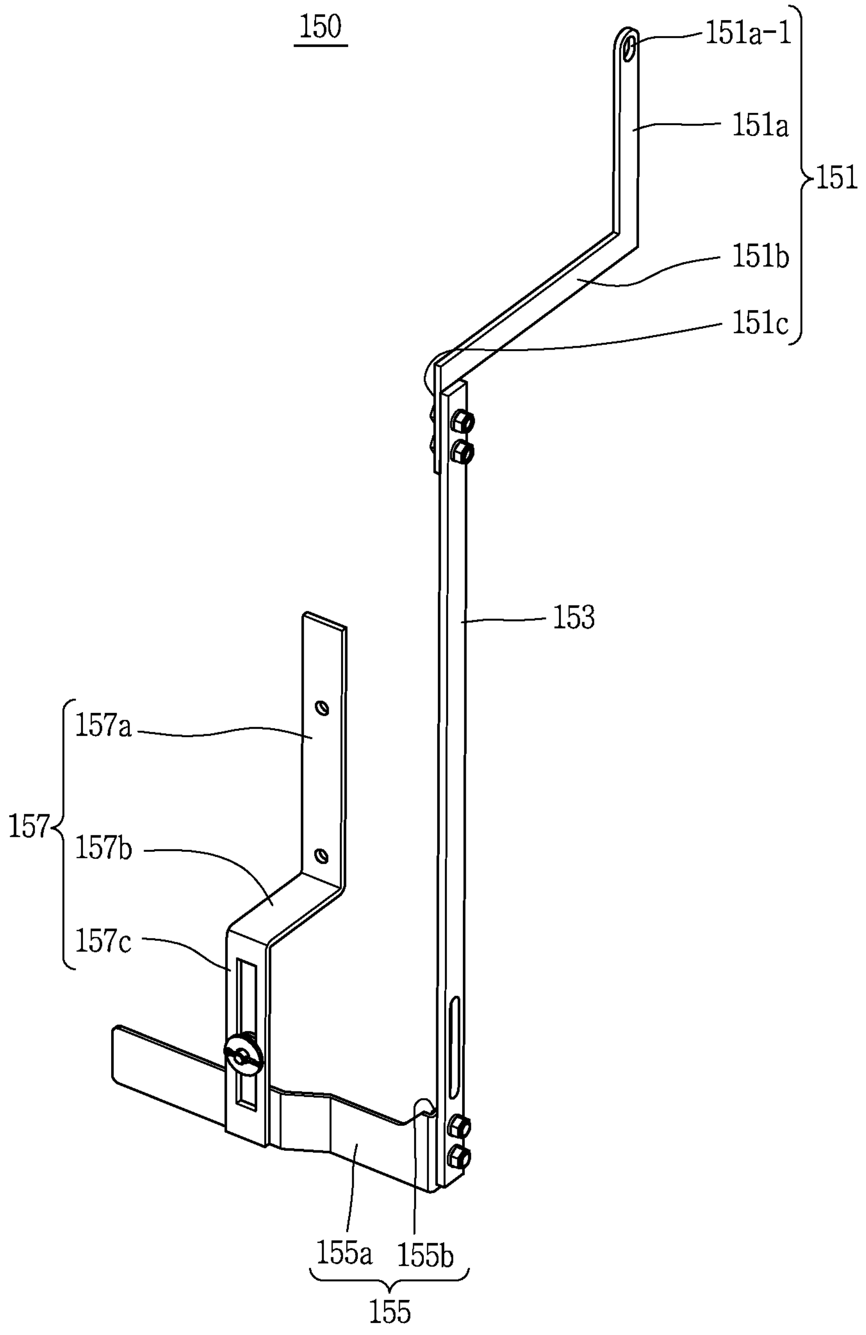
FIG. 8 is a perspective view illustrating an interlock apparatus included in a ring main unit according to an embodiment of the present invention.
Figure 9:
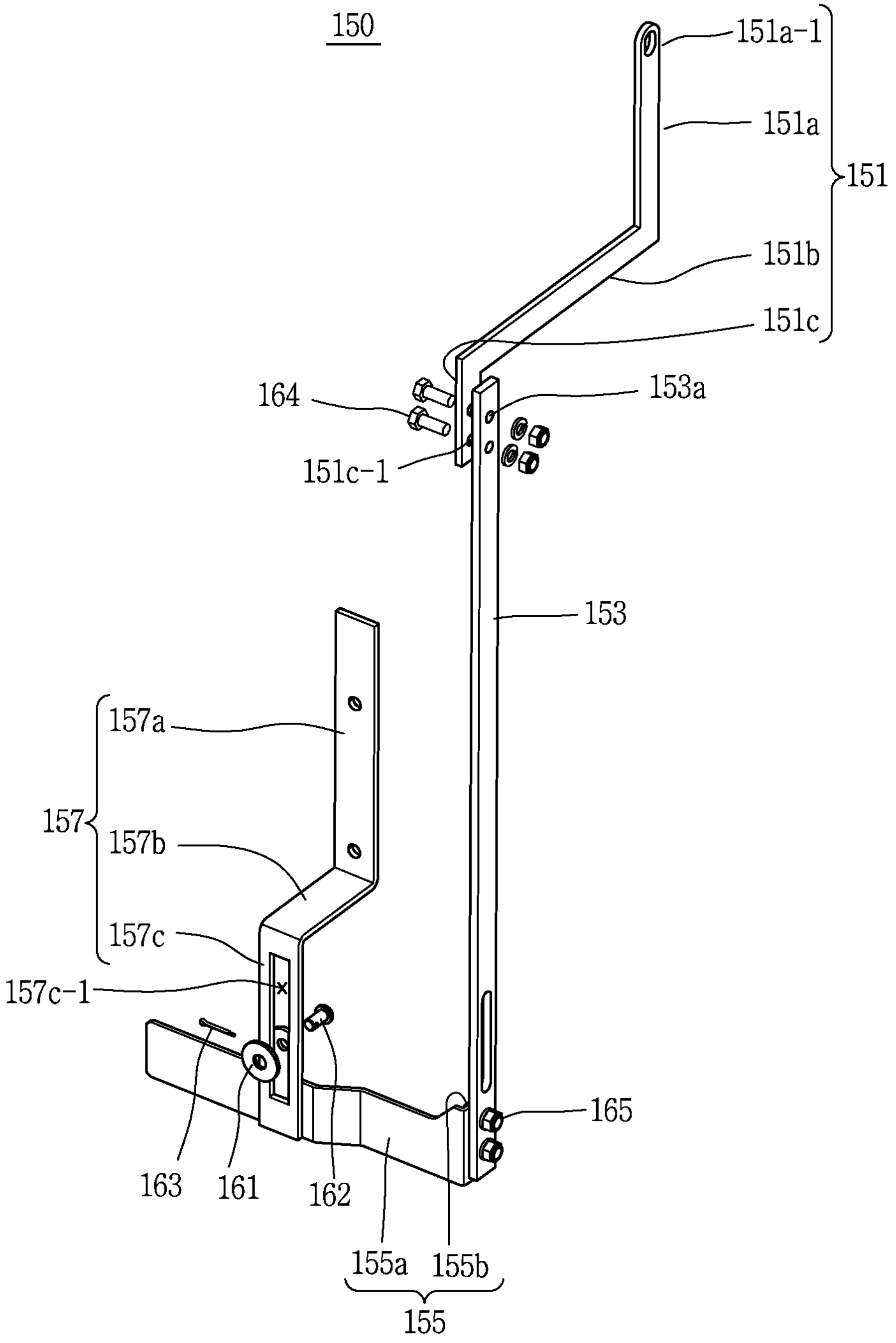
FIG. 9 is an exploded perspective view illustrating an interlock apparatus included in a ring main unit according to an embodiment of the present invention.

FIG. 7 is a perspective view illustrating a state where an interlock apparatus is included in a ring main unit according to an embodiment of the present invention. FIG. 8 is a perspective view illustrating an interlock apparatus included in a ring main unit according to an embodiment of the present invention. FIG. 9 is an exploded perspective view illustrating an interlock apparatus included in a ring main unit according to an embodiment of the present invention.

Figure 10:
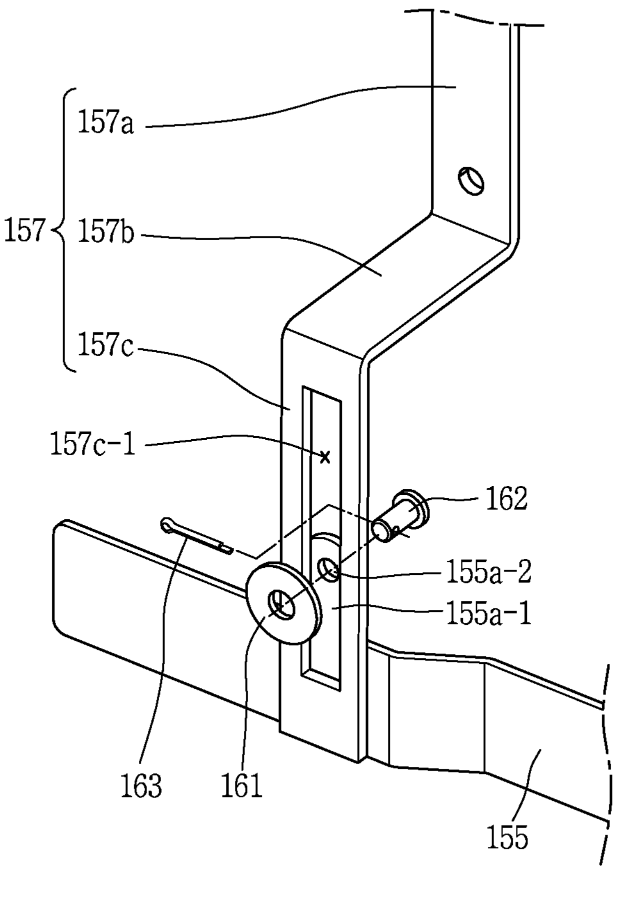
FIG. 10 is an exploded perspective view illustrating a connection state between an insertion prevention plate and a guide member of an interlock apparatus included in a ring main unit according to an embodiment of the present invention.
Figure 11:
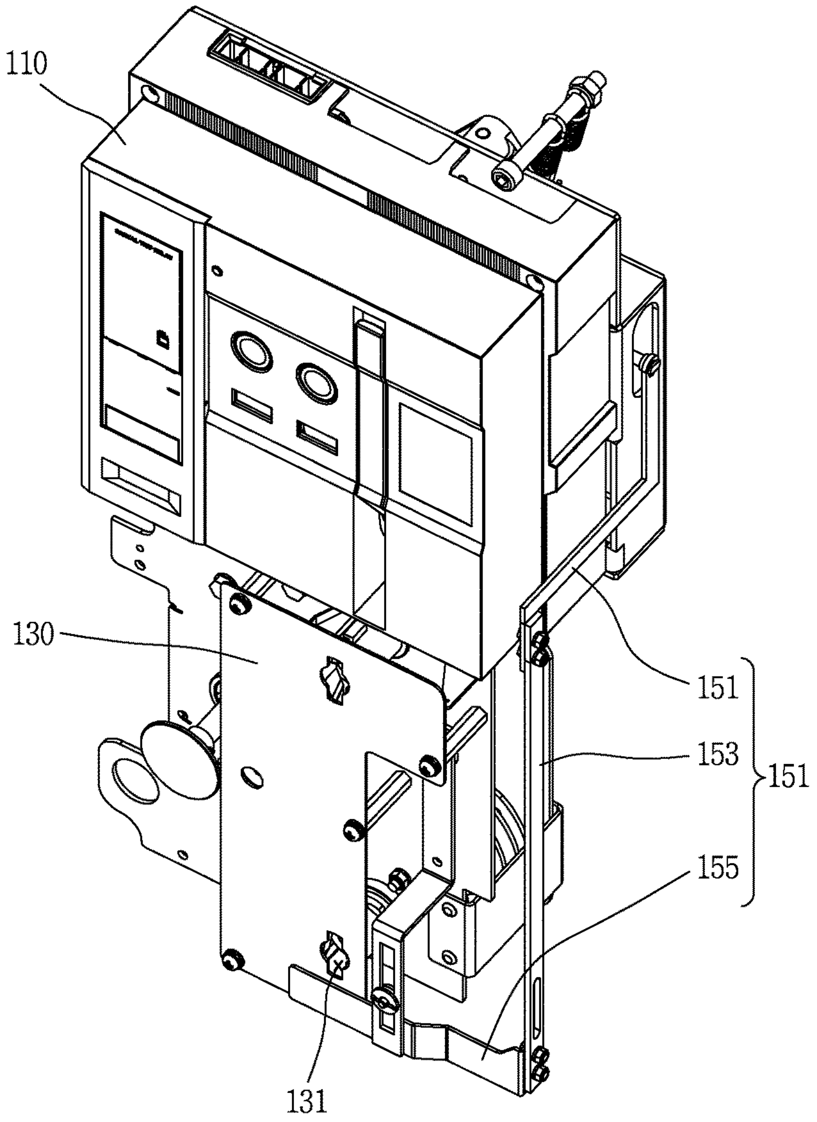
FIG. 11 is a perspective view illustrating an interlock apparatus when a circuit breaker is in an open state, in a ring main unit according to an embodiment of the present invention.
Figure 12:
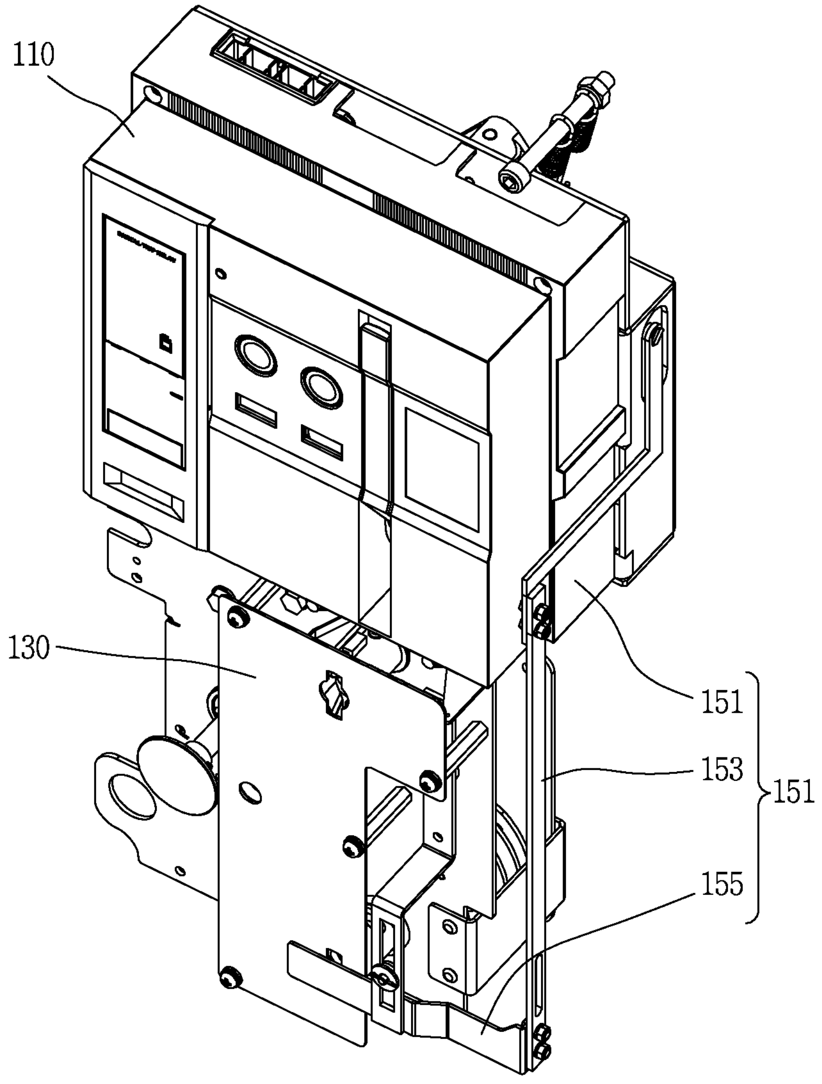
FIG. 12 is a perspective view illustrating an interlock apparatus when a circuit breaker is in a closed state, in a ring main unit according to an embodiment of the present invention.
Figure 13:
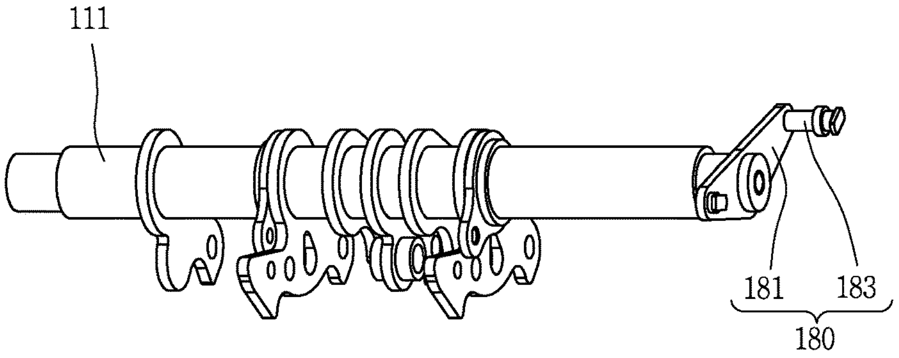
FIG. 13 is a partially enlarged view illustrating a rotary member is coupled to a shaft included in a circuit breaker of a ring main unit according to an embodiment of the present invention.
Figure 14:
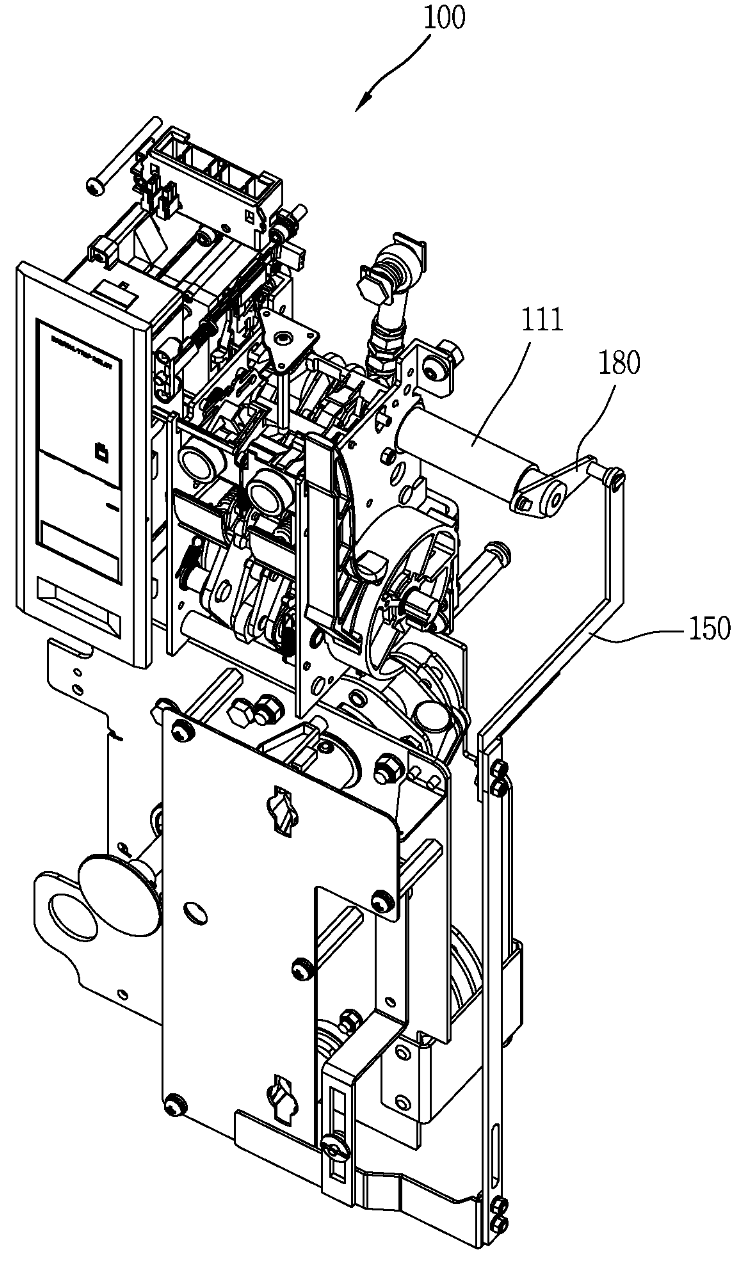
FIG. 14 is a perspective view illustrating a state where an interlock apparatus is coupled to a rotary member of a ring main unit according to an embodiment of the present invention.
Figure 15:
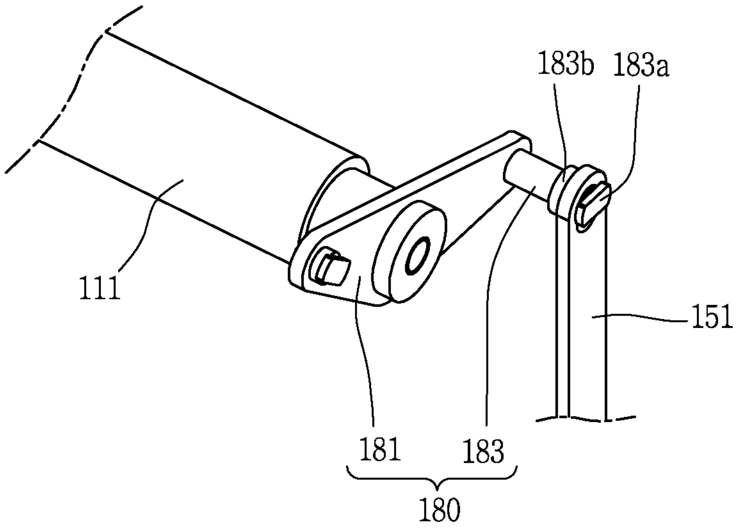
FIG. 15 is a partially enlarged view illustrating a state where an upper link is coupled to a rotary member of a ring main unit according to an embodiment of the present invention.

Moreover, FIG. 10 is an exploded perspective view illustrating a connection state between an insertion prevention plate and a guide member of an interlock apparatus included in a ring main unit according to an embodiment of the present invention. FIG. 11 is a perspective view illustrating an interlock apparatus when a circuit breaker is in an open state, in a ring main unit according to an embodiment of the present invention. FIG. 12 is a perspective view illustrating an interlock apparatus when a circuit breaker is in a closed state, in a ring main unit according to an embodiment of the present invention. FIG. 13 is a partially enlarged view illustrating a rotary member is coupled to a shaft included in a circuit breaker of a ring main unit according to an embodiment of the present invention. FIG. 14 is a perspective view illustrating a state where an interlock apparatus is coupled to a rotary member of a ring main unit according to an embodiment of the present invention. FIG. 15 is a partially enlarged view illustrating a state where an upper link is coupled to a rotary member of a ring main unit according to an embodiment of the present invention.

As illustrated in FIG. 7, an interlock apparatus 150 of a ring main unit 100 according to an embodiment of the present invention may be disposed between a circuit breaker 110 and a disconnector 130. When the circuit breaker 110 is in a closed state, the interlock apparatus 150 may close an insertion hole 131 included in the disconnector 130, thereby preventing a state of the disconnector 130 from being controlled through a handle (not shown).

Moreover, when the circuit breaker 110 is in a cutoff state, the interlock apparatus 150 may open the insertion hole 131, thereby enabling a closed/cutoff state of the disconnector 130 to be controlled through the handle.

In this case, as illustrated in FIGS. 8 to 10, 13 and 14, the interlock apparatus 150 of the ring main unit 100 according to an embodiment of the present invention may include a rotary member 180, an upper link 151, a lower link 153, and an insertion prevention plate 155.

As a shaft 111 included in the circuit breaker 110 rotates, the rotary member 180 may rotate in cooperation with the shaft 111. In this case, when the rotary member 180 operates in order for the circuit breaker 110 to be put in a closed or cutoff state, the rotary member 180 may rotate according to the rotation of the shaft 111.

An upper portion of the upper link 151 may be coupled to the rotary member 180, and the upper link 151 may vertically move according to the rotation of the rotary member 180.

In this case, the upper link 151 may include a first vertical plate 151*a*, a horizontal plate 151*b*, and a second vertical plate 151*c*.

An upper portion of the first vertical plate 151*a* may be fitted into the rotary member 180, and an upper hole 151*a*-1 may be provided in the upper portion of the first vertical plate 151*a*. Therefore, a fitting part of the rotary member 180 to be described below may be fitted into the upper hole 151*a*-1, and thus, the first vertical plate 151*a* may be coupled to the rotary member 180.

The horizontal plate 151*b* may be provided to extend and may be bent in a direction from the first vertical plate 151*a* to a side. The second vertical plate 151*c* may be provided to extend and may be bent in a direction from the horizontal plate 151*b* to a lower side. The second vertical plate 151*c* may be coupled to an upper portion of the lower link 153.

The lower link 153 may be vertically coupled to the second vertical plate 151*c* of the upper link 151 and may vertically move according to a movement of the upper link 151.

In this case, a plurality of through holes 151*c*-1 and 153*a* may be respectively provided at correspondence positions in an upper portion of the lower link 153 and the second vertical plate 151*c*. A fastening member 164 such as a bolt or the like may pass through the through holes 151*c*-1 and 153*a*, and thus, the lower link 153 may be coupled to the second vertical plate 151*c*.

The insertion prevention plate 155 may be coupled to a lower portion of the lower link 153 and may be disposed near the insertion hole 131. The insertion prevention plate 155 may vertically move according to a movement of the lower link 153.

At this time, when the rotary member 180 upward rotates according to a rotation of the shaft 111 in a closed state of the circuit breaker 110, the upper link 151 and the lower link 153 coupled to the upper link 153 may upward move, and simultaneously, the insertion prevention plate 155 may upward move, thereby closing the insertion hole 131.

Moreover, when the rotary member 180 downward rotates according to a rotation of the shaft 111 in a cutoff state of the circuit breaker 110, the upper link 151 and the lower link 153 coupled thereto may downward move, and simultaneously, the insertion prevention plate 155 may downward move, thereby opening the insertion hole 131 to put the handle in a state capable of being inserted into the insertion hole 131.

As illustrated in FIG. 15, the rotary member 180 may include a body plate 181 and a fitting part 183.

The body plate 181 may be coupled to the shaft 111 through welding. The fitting part 183 may protrude in a direction from the body plate 181 to a side, and thus, an upper portion of the upper link 151 may be fitted into the fitting part 183.

In this case, a first adhesion plate 183*a* may be provided in a front end (one side of the fitting part 183 in a direction in which the upper link 151 is disposed) of the fitting part 183 so that the upper link 151 does not deviate from the fitting part 183 in a state of being fitted into the fitting part 183. Also, a second adhesion plate 183*a* may be provided in the fitting part 183 so that the upper link 151 does not move toward the body plate 181 in a state of being fitted into the fitting part 183, and may be disposed in a direction from the first adhesion plate 183*a* to the body plate 181 and spaced apart from the first adhesion plate 183*a*.

Therefore, in a state where the upper link 151 is fitted into the fitting part 183, the first adhesion plate 183*a* prevents the upper link 151 from deviating from the fitting part 183. Also, in a state where the upper link 151 is fitted into the fitting part 183, the second adhesion plate 183*b* prevents the upper link 151 from further moving toward the body plate 181.

The interlock apparatus 150 may further include a guide member 157 that is disposed adjacent to the insertion prevention plate 155 to guide a vertical movement of the insertion prevention plate 155.

In this case, the guide member 157 may include a connection plate 157*a*, an extension plate 157*b*, and a guide plate 157*c*.

The connection plate 157*a* may be coupled to the disconnector 130, and thus, the guide member 157 may be disposed in a state of being coupled to the disconnector 130.

The extension plate 157*b* may be provided to extend to a side of the connection plate 157*a*, and thus, the guide plate 157*c* may move in front of the insertion hole 131.

The guide plate 157*c* may be provided to extend to a lower side of the extension plate 157*b*, and a guide hole 157*c*-1 that guides a movement of the insertion prevention plate 155 may be provided in the guide plate 157*c*.

Moreover, the insertion prevention plate 155 may include a front plate 155*a* and a side plate 155*b*.

The front plate 155*a* may open or close the insertion hole 131 while vertically moving in front of the insertion hole 131, based on a state of the circuit breaker 110.

The side plate 155*b* may be provided to extend and may be bent in a direction from one end to an inner side of the front plate 155*a*, and the side plate 155*b* may be coupled to a lower portion of the lower link 153. The side plate 155*b* may move according to a movement of the lower link 153 to allow the front plate 155*a* to open or close the insertion hole 131.

In this case, a through hole (not shown) may be provided in each of the side plate 155*b* and the lower portion of the lower link 153. A fastening member 165 such as a bolt or the like may pass through the through hole, and thus, the side plate 155*b* may be coupled to the lower link 153.

A connection part 155*a*-1 may be provided in an upper end of the front plate 155*a* to protrude to an upper side, and a connection hole 155*a*-1 may be provided in the connection part 155*a*-1. A washer 161 may be provided in front of the guide plate 157*c*.

In this case, a connection pin 162 may be provided to pass through the washer 161, the guide hole 157*c*-1, and the connection hole 155*a*-1, and thus, the insertion prevention plate 155 may vertically move along the guide hole 157*c*-1 in a state of being closely adhered to the guide member 157.

Moreover, a fastening hole (not shown) may be provided in a front end of the connection pin 162 in order for a fixing pin 163 to be fastened thereinto. The fixing pin 163 may pass through the fastening hole in a state where the washer 161 is closely adhered to a front end of the insertion prevention plate 155, the washer 161 may be fixed and disposed between the fixing pin 163 and the insertion prevention plate 155.

Hereinafter, an operation of the interlock apparatus 150 of the ring main unit 100 according to an embodiment of the present invention will be described in detail with reference to the accompanying drawings.

First, when the circuit breaker 110 operates and thus is put in a cutoff state, the shaft 111 included in the circuit breaker 110 may rotate in order for the rotary member 180 to downward rotate.

When the rotary member 180 rotates downward, the upper link 151 coupled to the rotary member 180 may downward move in order for a rotational motion of the rotary member 180 to be changed to a rectilinear motion, and simultaneously, the lower link 153 coupled to the upper link 151 may downward move.

Moreover, the insertion prevention plate 155 coupled to the lower link 153 may downward move, and thus, as illustrated in FIG. 11, the insertion prevention plate 155 may put the insertion hole 131 in an open state.

In this case, since the insertion hole 131 is put in the open state, a user may fit the handle into the insertion hole 131, and then, may control a state of the disconnector 130 by rotating the handle.

Subsequently, when the circuit breaker 110 operates and thus is put in a closed state, the shaft 111 included in the circuit breaker 110 may rotate in order for the rotary member 180 to upward rotate. When the rotary member 180 rotates upward, the upper link 151 fitted into the rotary member 180, the lower link 153 coupled to the upper link 151, and the insertion prevention plate 155 coupled to the lower link 153 may upward move together.

At this time, when the insertion prevention plate 155 moves upward, as illustrated in FIG. 12, the insertion prevention plate 155 may close the insertion hole 131, and thus, the handle cannot be inserted into the insertion hole 131. Accordingly, in a closed state of the circuit breaker 110, the control of a state of the disconnector 130 is prevented.

The interlock apparatus 150 of the ring main unit 100 configured and operated as described above may change a rotational motion of the shaft 111 included in the circuit breaker 110 to a rectilinear motion, and thus, the insertion hole 131 may be opened or closed according to a closed or cutoff state of the circuit breaker 110. Accordingly, in the closed state of the circuit breaker 110, the control of a state of the disconnector 130 is prevented.

Moreover, when the circuit breaker 110 is in the closed state, the control of a state of the disconnector 130 is prevented, thereby preventing a breakage of the ring main unit 100 which is caused by manipulation of the disconnector 130 when the circuit breaker 110 is in the closed state.

Moreover, when the circuit breaker 110 is in the closed state, the control of a state of the disconnector 130 is prevented, and thus, a negligent accident caused by manipulation of the disconnector 130 does not occur, thereby preventing a user from being damaged.

Moreover, since the fitting part 183 is provided in the rotary member 180 and the fitting part 183 includes the first adhesion plate 183*a* and the second adhesion plate 183*b*, the first adhesion plate 183*a* prevents the upper link 151 from deviating from the fitting part 183 in a state where the upper link 151 is fitted into the fitting part 183, and moreover, the second adhesion plate 183*b* prevents a movement of the upper link 151 to an inner side. Accordingly, the upper link 151 is solidly coupled to the fitting part 183.

Moreover, the interlock apparatus 150 may include the upper link 151, the lower link 153, and the insertion prevention plate 155, and thus, the upper link 151, the lower link 153, and the insertion prevention plate 155 may be coupled to each other through the fastening members 164 and 165. Accordingly, assembly or disassembly of the interlock apparatus 150 is easily made.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. An interlock apparatus of a ring main unit, including a circuit breaker which includes a shaft operating according to a closing or cutoff operation and a disconnector where an insertion hole into which a handle for controlling a closed or cutoff state is inserted is provided, the interlock apparatus comprising:
- a rotary member configured to rotate in cooperation with the shaft according to a rotation of the shaft;
- an upper link coupled to the rotary member to vertically move according to a rotation of the rotary member;
- a lower link coupled to the upper link to vertically move according to a movement of the upper link; and
- an insertion prevention plate coupled to a lower portion of the lower link to vertically move according to a movement of the lower link, wherein when the circuit breaker is in the closed state, the insertion prevention plate closes the insertion hole, and when the circuit breaker is in the cutoff state, the insertion prevention plate opens the insertion hole.

2. The interlock apparatus of claim 1, wherein the rotary member comprises:
- a body plate fitted into one end of the shaft; and
- a fitting part protruding to a side of the body plate, an upper portion of the upper link being fitted into the fitting part.

3. The interlock apparatus of claim 2, wherein
- a first adhesion plate is provided in a front end of the fitting part so that the upper link does not deviate from the fitting part in a state of being fitted into the fitting part, and
- a second adhesion plate is provided in the fitting part to prevent the upper link from moving toward the body plate in a state of being fitted into the fitting part, and is disposed to be spaced apart from the first adhesion plate in a direction from the first adhesion plate to the body plate.

4. The interlock apparatus of claim 1, wherein the upper link comprises:
- a first vertical plate, an upper portion of the first vertical plate being fitted into the rotary member;
- a horizontal plate provided to extend and bent in a direction from the first vertical plate to a side; and
- a second vertical plate provided to extend and bent in a direction from the horizontal plate to a lower side, an upper portion of the lower link being coupled to the second vertical plate.

5. The interlock apparatus of claim 4, wherein
- a plurality of through holes are respectively provided at correspondence positions in the upper portion of the lower link and the second vertical plate, and
- a fastening member passes through the plurality of through holes, and the lower link is coupled to the second vertical plate.

6. The interlock apparatus of claim 1, further comprising:
- a guide member disposed adjacent to the insertion prevention plate to guide a vertical movement of the insertion prevention plate.

7. The interlock apparatus of claim 6, wherein the guide member comprises:
- a connection plate coupled to the disconnector;
- an extension plate provided to extend to a side of the connection plate; and
- a guide plate provided to extend to a lower side of the extension plate, the guide hole guiding a movement of the insertion prevention plate.

8. The interlock apparatus of claim 7, wherein the insertion prevention plate comprises:
- a front plate disposed in front of the insertion hole; and
- a side plate provided to extend and bent in a direction from one end to an inner side of the front plate, the lower link being coupled to the side plate.

9. The interlock apparatus of claim 8, wherein
- a through hole is provided in each of the side plate and the lower portion of the lower link, and
- a fastening member passes through the through hole, and the side plate is coupled to the lower link.

10. The interlock apparatus of claim 8, wherein
- a connection part is provided in an upper end of the front plate to protrude to an upper side,
- a connection hole is provided in the connection part,
- a washer is provided in front of the guide plate, and
- a connection pin is coupled to pass through the washer, the guide hole, and the connection hole, and the insertion prevention plate moves along the guide hole in a state of being closely adhered to the guide member.

11. The interlock apparatus of claim 10, wherein
- a fastening hole is provided in a front end of the connection pin, a fixing pin being fastened into the fastening hole, and
- the fixing pin is disposed in front of the washer to pass through the fastening hole, and prevents the washer from deviating from a normal position.

* * * * *